United States Patent Office 3,073,840
Patented Jan. 15, 1963

3,073,840
BENZ[D]ISOXAZOLE DERIVATIVES

Hideo Kano, Kamikyo-ku, Masaru Ogata, Higashinada-ku, Ryonosuke Kido, Ikeda-shi, and Kenjiro Yamamoto, Senboku-gun, Japan, assignors to Shionogi & Co., Ltd., Osaka, Japan
No Drawing. Filed Aug. 21, 1961, Ser. No. 132,554
Claims priority, application Japan Aug. 24, 1960
6 Claims. (Cl. 260—307)

This invention relates to benz[d]isoxazole derivatives. More particularly, this invention relates to 1-alkyl- or 1-arylalkyl-2-(4,5,6,7 - tetrahydro - 3 - benz[d]isoxazolyl-carbonyl)-hydrazine derivatives and production thereof.

The objective compounds of the present invention may be represented by the structural formula

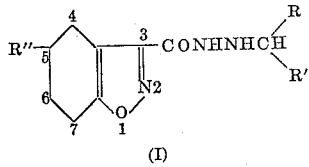

(I)

wherein R represents hydrogen, alkyl, phenyl, alkoxyphenyl or halophenyl, R' represents alkyl, phenyl, alkoxyphenyl or halophenyl, and R" represents hydrogen or alkyl.

The compound of Formula I is prepared according to the following schema:

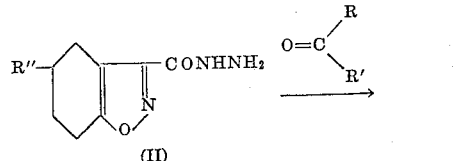

(II)

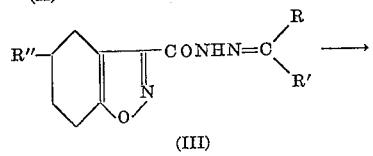

(III)

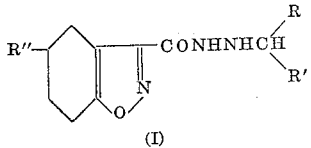

(I)

wherein R, R' and R" have the same significances as above.

The starting material of this invention represented by the Formula II can be prepared, for example, by reacting 3-alkoxycarbonyl-4,5,6,7 - tetrahydrobenz[d]isoxazole or 3-alkoxycarbonyl - 5 - alkyl - 4,5,6,7-tetrahydrobenz[d]-isoxazole with hydrazine hydrate. 3-alkoxycarbonyl-4,5,6,7-tetrahydrobenz[d]isoxazole is prepared by condensing hydroxylamine with 2-alkoxalyl-1-cyclohexanone, which is produced by condensing oxalic diester with cyclohexanone in the presence of sodium alcoholate. The 5-alkyl compound can be drived from 4-alkylcyclohexanone in the same manner with above.

In the first step the starting material (II) was reacted with carbonyl compound to afford 1-alkyliden- or 1-arylalkyliden - 2 - (4,5,6,7 - tetrahydro-3-benz[d]isoxazolyl-carbonyl)-hydrazine (III). The reaction is generally carried out in a suitable organic solvent, preferably in alcohol.

As a carbonyl compound, acetaldehyde, benzaldehyde, p-chlorobenzaldehyde, p-methoxybenzaldehyde, acetone and acetophenone may be exemplified.

Subsequently thus obtained hydrazone-type intermediates (III) are reduced to the objective compounds (I) with lithium aluminium hydride in ether or tetrahydrofuran, or with sodium borohydride in aqueous alcohol. Alternatively, catalytic reduction may be employed effectively. For example, the hydrazone (III) can be reduced to the hydrazine (I) with hydrogen gas in the presence of palladium-carbon as catalyst.

The compounds represented by Formula I, which are usually administered as acid addition salts, e.g. hydrochloride, hydrobromide, hydroiodide, sulfate, phosphate, etc., are mono-amine oxidase inhibitors, that is, they inhibit the activity of mono-amine oxidase which deactivates physiological regulators such as serotonin, tryptamine, epinephrine, etc. They are therapeutically useful for treatment of mental diseases, particularly of depressions.

The compounds of this invention are distinguished by low toxicity and absence of unfavourable side-action, in comparison with already known mono-amine oxidase inhibiting agents.

For example, 1-benzyl-2-(4,5,6,7-tetrahydro-3-benz[d]-isoxazolylcarbonyl)-hydrazine shows 2 to 8 times the $LD_{50}$ value, as compared with commercially available 1-benzyl-2-(5-methyl-3-isoxazolylcarbonyl)-hydrazine:

$LD_{50}$(mg./kg.)

| Compound | Mouse | | Cat Oral |
|---|---|---|---|
| | I.P. | Oral | |
| (benzyl-tetrahydrobenz[d]isoxazolyl compound) | 723 | 2,082 | 118.1 |
| (benzyl-methylisoxazolyl compound) | 217 | 255 | 56.36 |

For the purpose of therapeutical application, it is extremely favorable that the activity of mono-amine oxidase is selectively inhibited in the brain and is not affected in the liver. From this viewpoint, the compounds of this invention are extremely distinguished as they have such selectivity in high ratio. For example, the result of comparative in vivo test is as following:

| Compound | Inhibitory Percentage in brain | Inhibitory Percentage in liver |
|---|---|---|
| (benzyl-tetrahydrobenz[d]isoxazolyl compound) | 95 | 14 |
| (benzyl-methylisoxazolyl compound) | 100 | 60 |

NOTE.—$10^{-4}$ mol/kg. of the compound was administered to rat (about 120 g. weight) by intraperitoneal injection, the rat was sacrificed after 24 hours, and the activities of mono-amine oxidase of homogenates of the brain and the liver were tested.

As the compounds of this invention inhibit selectively mono-amine oxidase in the brain, no unfavorable side-action has been observed even in clinical tests.

Therefore, the present invention provides excellent drugs suitable for treatment of mental diseases, especially suitable for large quantity administrations or administrations in long term.

EXAMPLE

*Condensation.*—(4,5,6,7-tetrahydro - 3-benz[d]isoxazolylcarbonyl)-hydrazine (181 g.) was dissolved in 95% ethanol (1.5 l.). To the solution was added benzaldehyde at 40° C. with agitation. The reaction proceeded with generation of heat.

After cooling, the precipitates were corrected by filtration, and washed with ethanol to afford 246 g. of 1-benzyliden - 2 - (4,5,6,7-tetrahydro-3-benz[d]isoxazolylcarbonyl)-hydrazine, M.P. 222–223° C. (recrystallized from ethanol).

*Analysis.*—Calcd. for $C_{15}H_{15}O_2N_3$: C, 69.90; H, 5:61; N, 15.61. Found: C, 66.78; H, 5.57; N, 15.49.

*Reduction with sodium borohydride.*—1-benzyliden-2-(4,5,6,7-tetrahydro - 3 - benz[d]isoxazolylcarbonyl)-hydrazine (14 g.) was suspended in 99% ethanol (170 cc.) and water (30 cc.). To the suspension was added sodium borohydride (5 g.) portionwise. Keeping the temperature at 5° C., the mixture was stirred for 1 hr. and then acetic acid (5 cc.) was added, and the stirring was continued for 30 mins. more.

The mixture was concentrated to a half volume under reduced pressure, and extracted with chloroform after addition of water. After removal of chloroform the residue was recrystallised from cyclohexane to afford 12.2 g. of 1-benzyl-2-(4,5,6,7-tetrahydro-3-benz[d]isoxazolylcarbonyl)-hydrazine, M.P. 86–88° C.

Hydrochloride: M.P. 202° C. (decomp.).

*Analysis.*—Calcd. for $C_{15}H_{17}O_2N_3$: C, 66.40; H, 6.32; N, 15.49. Found: C, 66.54; H, 6.45; N, 15.28.

*Reduction with lithium aluminium hydride.*—Lithium aluminium hydride (1 g.) was dissolved in anhydrous ether (150 cc.) and stirred at 30° C. Then 1-benzyliden-2-(4,5,6,7-tetrahydro - 3-benz[d]isoxazolylcarbonyl)-hydrazine (7 g.) was added portionwise, in the course of 15 mins.

After 2 hrs., a little portion of water was added and the ether layer was separated, and evaporated. The residue was recrystallized from cyclohexane to afford 2.2 g. of 1-benzyl-2-(4,5,6,7-tetrahydro-3-benz[d]isoxazolylcarbonyl)-hydrazine, M.P. 86–88° C.

*Catalytic reduction.*—1-benzyliden - 2 - (4,5,6,7-tetrahydro-3-benz[d]isoxazolylcarbonyl) - hydrazine (12 g.) was dissolved in methanol (500 cc.), and 10% palladium-carbon (1.5 g.) was added. Then the mixture was treated according to catalytic reduction procedure. After absorption of about 1 mole equivalent of hydrogen, the catalyst was filtered off, and methanol was removed. The residue was extracted with ether, and the ether layer was treated with 6 N hydrochloric acid to afford crude hydrochloride. Recrystallizing from methanol-benzene, there was obtained 6.8 g. of 1-benzyl-2-(4,5,6,7-tetrahydro-3-benz[d]isoxazolylcarbonyl)-hydrazine hydrochloride, M.P. 202° C. (decomp.).

In the same manner as above, the following compounds were synthesized.

1-(p-methoxybenzyl) - 2-(4,5,6,7-tetrahydro-3-benz[d]isoxazoylcarbonyl)-hydrazine, M.P. 95–96° C.

*Analysis.*—Calcd. for $C_{16}H_{19}O_3N_3$: C, 63.77; H, 6.36; N, 13.95. Found: C, 63.73; H, 6.46; N, 14.07.

1-(p-chlorobenzyl) - 2 - (4,5,6,7 - tetrahydro-3-benz[d]isoxazolylcarbonyl)-hydrazine, M.P. 127.5° C.

*Analysis.*—Calcd. for $C_{15}H_{16}O_2N_3Cl$: C, 58.82; H, 5.22; N, 13.72. Found: C, 58.52; H, 5.16; N, 13.47.

1-(isopropyl - 2 - (4,5,6,7-tetrahydro-3-benz[d]isoxazolylcarbonyl)-hydrazine, M.P. 85–86° C.

*Analysis.*—Calcd. for $C_{11}H_{17}O_2N_3$: C, 59.17; H, 7.68; N, 18.82. Found: C, 59.19; H, 7.80; N, 18.64.

1-(α-phenylethyl) - 2 - (4,5,6,7-tetrahydro-3-benz[d]isoxazolylcarbonyl)-hydrazine, M.P. 82–83° C.

*Analysis.*—Calcd. for $C_{16}H_{19}O_2N_3$: C, 67.34; H, 6.71; N, 14.73. Found: C, 67.42; H, 6.89; N, 14.88.

1-benzyl - 2 -(5-methyl - 4,5,6,7-tetrahydro-3-benz[d]isoxazolylcarbonyl)-hydrazine hydrochloride, M.P. 186–187° C. (decomp.).

*Analysis.*—Calcd. for $C_{16}H_{19}O_2N_3HCl$: C, 59.50; H, 6.23; N, 13.09. Found: C, 59.76; H, 6.19; N, 12.76.

Thus describing our invention, we claim:

1. 1-benzyl - 2 - (4,5,6,7-tetrahydro-3-benz[d]isoxazolylcarbonyl)-hydrazine.
2. 1-(p-methoxybenzyl)-2-(4,5,6,7 - tetrahydro-3-benz[d]isoxazolylcarbonyl)-hydrazine.
3. 1-(p-chlorobenzyl) - 2 - (4,5,6,7-tetrahydro-3-benz[d]isoxazolylcarbonyl)-hydrazine.
4. 1-isopropyl - 2-(4,5,6,7-tetrahydro-3-benz[d]isoxazolylcarbonyl)-hydrazine.
5. 1-(α-phenylethyl)-2 - (4,5,6,7-tetrahydro-3-benz[d]-isoxazolylcarbonyl)-hydrazine.
6. 1-benzyl - 2-(5-methyl-4,5,6,7-tetrahydro-3-benz[d]-isoxazolylcarbonyl)-hydrazine.

References Cited in the file of this patent

UNITED STATES PATENTS 2,908,688    Gardner et al. _____ Oct. 13, 1959